US012632344B2

(12) United States Patent
Lu et al.

(10) Patent No.: US 12,632,344 B2
(45) Date of Patent: May 19, 2026

(54) NETWORK NODES AND METHODS THEREIN FOR PROVIDING BACKUP NETWORK FUNCTION

(71) Applicant: Telefonaktiebolaget LM Ericsson (publ), Stockholm (SE)

(72) Inventors: Yunjie Lu, Shanghai (CN); Yong Yang, Kållered (SE); Gang Ren, Shanghai (CN); Xiao Li, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 97 days.

(21) Appl. No.: 18/032,392

(22) PCT Filed: Sep. 22, 2021

(86) PCT No.: PCT/CN2021/119676
§ 371 (c)(1),
(2) Date: Apr. 18, 2023

(87) PCT Pub. No.: WO2022/083385
PCT Pub. Date: Apr. 28, 2022

(65) Prior Publication Data
US 2023/0385161 A1      Nov. 30, 2023

(30) Foreign Application Priority Data

Oct. 23, 2020    (WO) ................ PCT/CN2020/123350

(51) Int. Cl.
*G06F 11/14*          (2026.01)
*G06F 11/1446*        (2026.01)

(52) U.S. Cl.
CPC ...... *G06F 11/1464* (2013.01); *G06F 11/1451* (2013.01)

(58) Field of Classification Search
CPC .. G06F 11/14; G06F 11/1464; G06F 11/1451; G06F 11/1458; H04L 67/146; H06L 45/586
See application file for complete search history.

(56) References Cited

U.S. PATENT DOCUMENTS 11,129,215 B2 *   9/2021   Bharatia ............. H04L 65/1073
12,004,059 B2 *   6/2024   S Bykampadi ......... H04L 67/51
(Continued)

FOREIGN PATENT DOCUMENTS

CN          11083543 A      2/2020
WO        2019223855 A1    11/2019
(Continued)

OTHER PUBLICATIONS

T. Taleb, A. Ksentini and B. Sericola, "On Service Resilience in Cloud-Native 5G Mobile Systems," in IEEE Journal on Selected Areas in Communications, vol. 34, No. 3, pp. 483-496, Mar. 2016.*
(Continued)

*Primary Examiner* — Pierre Michel Bataille
(74) *Attorney, Agent, or Firm* — Withrow & Terranova, PLLC

(57)          ABSTRACT

The present disclosure provides a method in a network node implementing a Network Function, NF. The method includes: transmitting, to another NF, information indicating an identifier, ID, of each of one or more backup entities for one or more contexts in the NF. The information is included in a binding indication or a separate indication from the binding indication. The one or more backup entities are one or more backup NF instances or one or more backup NF service instances.

6 Claims, 4 Drawing Sheets

(56) References Cited

U.S. PATENT DOCUMENTS

| | | | | |
|---|---|---|---|---|
| 2020/0028920 | A1* | 1/2020 | Livanos | H04W 8/26 |
| 2021/0105196 | A1* | 4/2021 | Dao | H04L 47/24 |
| 2021/0168215 | A1* | 6/2021 | Zong | H04L 67/146 |
| 2021/0258406 | A1* | 8/2021 | Ali | H04W 68/005 |
| 2021/0297935 | A1* | 9/2021 | Belling | H04L 45/00 |
| 2021/0306875 | A1* | 9/2021 | Zhang | H04W 24/02 |
| 2021/0306907 | A1* | 9/2021 | Landais | H04W 28/0284 |
| 2022/0015023 | A1* | 1/2022 | De-Gregorio-Rodriguez | H04W 48/18 |
| 2022/0053372 | A1* | 2/2022 | Shekhar | H04L 67/56 |
| 2022/0086734 | A1* | 3/2022 | Aggarwal | H04W 12/084 |
| 2022/0210060 | A1* | 6/2022 | Wang | H04L 45/586 |
| 2022/0232460 | A1* | 7/2022 | Fu | H04W 12/10 |
| 2022/0247827 | A1* | 8/2022 | Das | H04L 67/51 |
| 2022/0303793 | A1* | 9/2022 | Patil | H04W 24/04 |

FOREIGN PATENT DOCUMENTS

| | | | | |
|---|---|---|---|---|
| WO | WO-2020002507 | A1 * | 1/2020 | H04L 69/322 |
| WO | WO-2020202043 | A1 * | 10/2020 | H04L 67/51 |
| WO | WO-2020254925 | A1 * | 12/2020 | H04L 63/104 |
| WO | WO-2022035695 | A1 * | 2/2022 | H04L 41/40 |

OTHER PUBLICATIONS

R. Ahmed et al., "Service naming in large-scale and multi-domain networks," in IEEE Communications Surveys & Tutorials, vol. 7, No. 3, pp. 38-54, Third Quarter 2005.*

Dominic Duggan, "Service-Oriented Architecture," in Enterprise Software Architecture and Design: Entities, Services, and Resources , IEEE, 2012, pp. 207-358.*

Author Unknown, "Technical Specification Group Services and System Aspects; System architecture for the 5G System (5GS): Stage 2 (Release 16)," Technical Specification 23.501, Version 16.6.0, Sep. 2020, 3GPP Organizational Partners, 447 pages.

Author Unknown, "Technical Specification Group Core Network and Terminals; 5G System; Technical Realization of Service Based Architecture; Stage 3 (Release 17)," Technical Specification 29.500, Version 17.0.0, Sep. 2020, 3GPP Organizational Partners, 82 pages.

Notice of Reasons for Rejection for Japanese Patent Application No. 2023-524870, mailed Jun. 11, 2024, 6 pages.

Author Unknown, "Technical Specification Group Services and System Aspects; System architecture for the 5G System (5GS): Stage 2 (Release 16)," Technical Specification 23.501, Version 16.4.0, Mar. 2020, 3GPP Organizational Partners, 430 pages.

Author Unknown, "Technical Specification Group Core Network and Terminals; 5G System; Technical Realization of Service Based Architecture; Stage 3 (Release 16)," Technical Specification 29.500, Version 16.3.0, Mar. 2020, 3GPP Organizational Partners, 65 pages.

Nokia, et al., "S2-187460: Peer NF association of GUAMI with a given UE," 3GPP SA WG2 Meeting #128, Jul. 2-6, 2018, Vilnius, Lithuania, 5 pages.

International Search Report and Written Opinion for International Patent Application No. PCT/CN2021/119676, mailed Nov. 25, 2021, 9 pages.

International Preliminary Report on Patentability for International Patent Application No. PCT/CN2021/119676, mailed Feb. 15, 2023, 25 pages.

Ericsson, "C4-205355: Binding Indication for Backup AMF," 3GPP TSG-CT WG4 Meeting #101e, Nov. 3-13, 2020, Electronic Meeting, 7 pages.

Extended European Search Report for European Patent Application No. 21881804.5, mailed Aug. 6, 2024, 10 pages.

Notice of Reasons for Refusal for Japanese Patent Application No. 2023-524870, mailed Nov. 12, 2024, 8 pages.

* cited by examiner

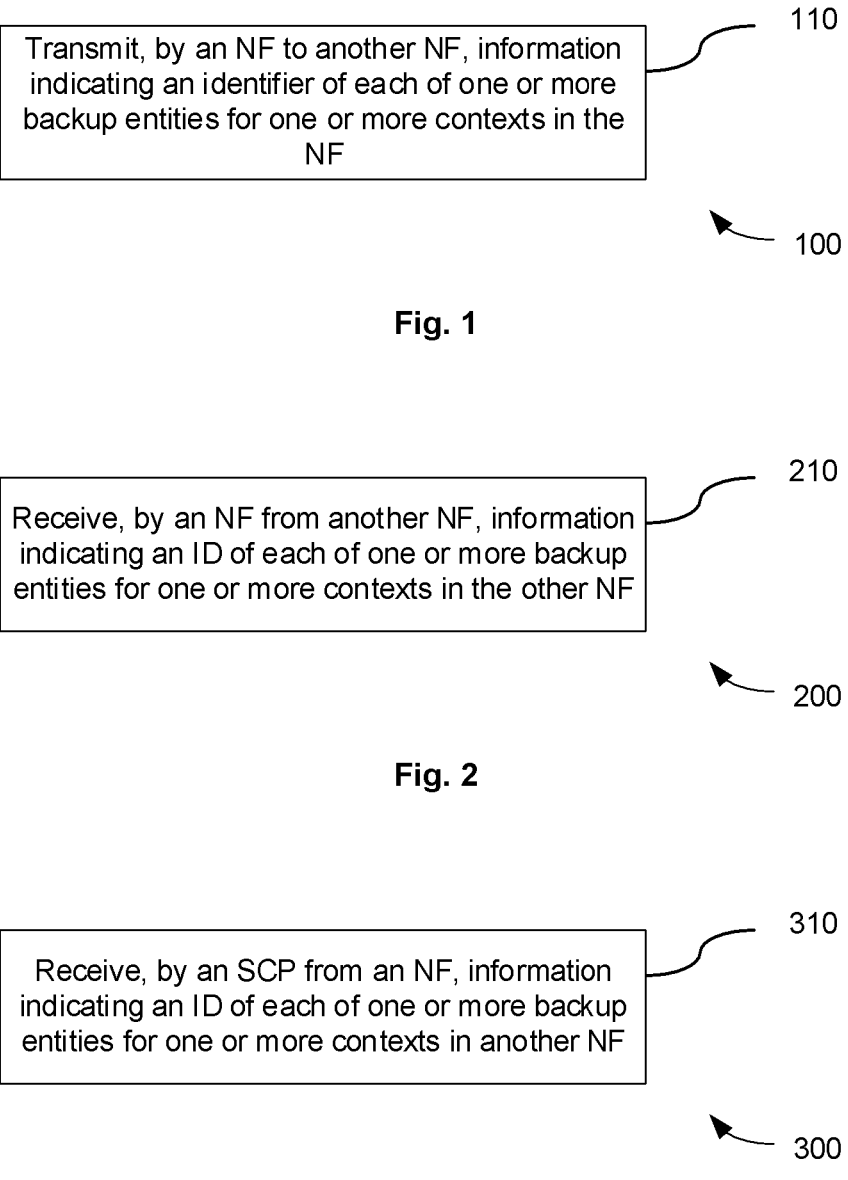

Transmit, by an NF to another NF, information indicating an identifier of each of one or more backup entities for one or more contexts in the NF — 110

Receive, by an NF from another NF, information indicating an ID of each of one or more backup entities for one or more contexts in the other NF — 210

Receive, by an SCP from an NF, information indicating an ID of each of one or more backup entities for one or more contexts in another NF — 310

NETWORK NODE
600

NETWORK NODE
700

NETWORK NODE
800

NETWORK NODES AND METHODS THEREIN FOR PROVIDING BACKUP NETWORK FUNCTION

This application is a 35 U.S.C. § 371 national phase filing of International Application No. PCT/CN2021/119676, filed Sep. 22, 2021, which claims the benefit of International Application No. PCT/CN2020/123350, filed Oct. 23, 2020, the disclosures of which are incorporated herein by reference in their entireties.

TECHNICAL FIELD

The present disclosure relates to communication technology, and more particularly, to network nodes and methods therein for providing a backup Network Function (NF).

BACKGROUND

In Release 16 (Rel-16), the $3^{rd}$ Generation Partnership Project (3GPP) has further broaden the use of Network Function (NF) Set concept to be applicable for all types of NFs in the $5^{th}$ Generation (5G) Core.

The 3GPP Technical Specification (TS) 23.501, V16.4.0, which is incorporated herein by reference in its entirety, gives a list of definitions related to NF service, NF service set, NF and NF set:

NF instance: an identifiable instance of the NF;

NF service: a functionality exposed by an NF through a service based interface and consumed by other authorized NFs;

NF service instance: an identifiable instance of the NF service;

NF service operation: an elementary unit an NF service is composed of;

NF Service Set: a group of interchangeable NF service instances of the same service type within an NF instance (the NF service instances in the same NF Service Set have access to the same context data); and NF Set: a group of interchangeable NF instances of the same type, supporting the same services and the same Network Slice(s) (the NF instances in the same NF Set may be geographically distributed but have access to the same context data.

As specified in clause 5.21.3.1 of TS 23.501, several NF instances can be deployed within an NF Set to provide distribution, redundancy and scalability together as a set of NF instances. In this case, an NF can be replaced with an alternative NF within the same NF Set in case of failure, load balancing, or load re-balancing. This applies for both service operations and notification delivery.

In case of failure of NF (service) instance, or to perform load re-balancing, a so-called "binding indication" is used to select the alternative NF (service) instance.

As specified in clause 6.3.1.0 of TS 23.501, binding can be used to indicate suitable target NF producer instance(s) for NF service instance selection, reselection and routing of subsequent requests associated with a specific NF producer resource (context) and NF service. This allows an NF service producer (or referred to as NF producer) to indicate that an NF service consumer (or referred to as NF consumer), for a particular context, should be bound to an NF service instance, NF instance, NF service set or NF set depending on local policies and other criteria (e.g. at what point it is in the middle of a certain procedure, considering performance aspects, etc.). Binding can also be used by the NF consumer to indicate suitable NF consumer instance(s) for notification target instance reselection and routing of subsequent notification requests associated with a specific notification subscription and for providing Binding Indication for service(s) that the NF consumer produces for the same data context and the NF service producer is subsequently likely to invoke.

A Binding Indication is information included by an NF service producer to an NF service consumer in request responses or notifications to convey the scope within which selection/reselection of target NF/NF Services may be performed, or information included by the NF service consumer in requests or subscriptions to convey the scope within which selection/reselection of notification targets or the selection of other service(s) that the NF consumer produces for the same data context may be performed.

Table 6.3.1.0-1 in TS 23.501, reproduced as Table 1 below, defines the selection and reselection behaviors of NF services consumers and Service Communication Proxies (SCPs) depending on the Binding Indication provided by an NF service producer.

TABLE 1

| | Binding, selection and reselection | | |
|---|---|---|---|
| Level of Binding Indication | The NF Consumer/ Notification sender/ SCP selects | The NF Consumer/ Notification sender/ SCP can reselect e.g. when selected producer is not available | Binding information for selection and re-selection |
| NF Service Instance | The indicated NF Service Instance | An equivalent NF Service instance: within the NF Service Set (if applicable) within the NF instance within the NF Set (if applicable) | NF Service Instance ID, NF Service Set ID, NF Instance ID, NF Set ID, Service name |
| NF Service Set | Any NF Service instance within the indicated NF Service Set | Any NF Service instance within an equivalent NF Service Set within the NF Set (if applicable) | NF Service Set ID, NF Instance ID, NF Set ID, Service name |
| NF Instance | Any equivalent NF Service instance within the NF instance. | Any equivalent NF Service instance within a different NF instance within the NF Set (if applicable) | NF Instance ID, NF Set ID, Service name |

TABLE 1-continued

Binding, selection and reselection

| Level of Binding Indication | The NF Consumer/ Notification sender/ SCP selects | The NF Consumer/ Notification sender/ SCP can reselect e.g. when selected producer is not available | Binding information for selection and re-selection |
|---|---|---|---|
| NF Set | Any equivalent NF Service instance within the indicated NF Set | Any equivalent NF Service instance within the NF Set | NF Set ID, Service name |

The Binding Indication can be contained in a Hyper Text Transfer Protocol (HTTP) header, 3gpp-Sbi-Binding, referring to the 3GPP TS 29.500, V16.3.0, which is incorporated herein by reference in its entirety. This header contains a comma-delimited list of Binding Indications from an HTTP server for storage and subsequent use by an HTTP client. The encoding of the header follows the Augmented Backus-Naur Form (ABNF) as defined in Internet Engineering Task Force (IETF) Request for Comments (RFC) 7230, June 2014.

3gpp-Sbi-Binding="3gpp-Sbi-Binding" ":"#(OWS "bl=" blvalue 1*(OWS ";" parameter))

blvalue="nfinstance"/"nfset"/"nfserviceinstance"/"nfserviceset"

parameter=parametername "=" token parametername="nfinst"/"nfset"/"nfservinst"/"nfserviceset"/"servname"/"scope"

scope="other-service"/"callback"/"subscription-events"

The following parameters are defined:

bl (binding level): indicates a binding to either a NF Instance, a NF set, a NF Service Instance or a NF Service Set.

nfinst (NF instance): indicates a NF Instance ID.

nfset (NF set): indicates a NF Set ID.

nfservinst (NF service instance): indicates a NF Service Instance ID.

nfserviceset (NF service set): indicates a NF Service Set ID.

scope: indicates the applicability of a Binding Indication in a service request. This may take one of the following values:

"other-service": the binding information applies to other service(s) that the NF Service Consumer may later on provide as an NF Service Producer;

"subscription-events": the binding information applies to subscription change event notifications;

"callback": the binding information applies to notification or callback requests.

The absence of this parameter in a Binding Indication in a service request shall be interpreted as "callback".

Two scope parameters may be present in a Binding Indication if the binding information applies to notification/callback requests and to other services.

servname (service name): indicates the name of a service or a custom service, i.e.:

the name of the service that handles a notification or a callback request, when present in a Binding Indication for a subscription or a callback, i.e. with a scope parameter absent or set to "callback"; or the name of the other service(s) for which the binding applies, when present in a Binding Indication in a service request for the other services the NF Service Consumer can provide later on as an NF Service Producer, i.e. with the scope parameter set to "other-service". More than one servname parameter may be present to represent multiple such services. The absence of this parameter in a Binding Indication with the scope parameter set to "other-service" shall be interpreted as binding information that applies to all the services that the NF Service Consumer may provide later as an NF Service Producer.

the definition and encoding of the blvalue and other parameters shall be as defined for the 3gpp-Sbi-Routing-Binding.

In Rel-16, as part of Network Function Service Framework, "Indirect Communication" is defined in clause 7.1.1 in TS 23.501. NF services may communicate directly between NF Service consumers and NF Service Producers, or indirectly via a Service Communication Proxy (SCP). Whether an NF Service Consumer uses Direct Communication or Indirect Communication by using an SCP is based on configuration of the NF Service Consumer. In Direct Communication, the NF Service consumer performs discovery of the target NF Service producer by local configuration or via an NF Repository Function (NRF). The NF Service consumer communicates with the target NF Service producer directly. In Indirect Communication, the NF Service consumer communicates with the target NF Service producer via a SCP. The NF Service consumer may be configured to perform discovery of the target NF Service producer directly, or delegate the discovery of the target NF Service Producer to the SCP used for Indirect Communication. In the latter case, the SCP uses the parameters provided by NF Service consumer to perform discovery and/or selection of the target NF Service producer. The SCP address may be locally configured in NF Service consumer.

According to clause 6.3.1.0 of TS 23.501, the Binding Indication contains the information in Table 1. The Routing Binding Indication may be included in Request, Subscribe or Notification messages. It can be used in the case of indirect communication by the SCP to route the message. The Routing Binding Indication is a copy of the information in the Binding Indication and also contains the information in Table 1.

SUMMARY

It is an object of the present disclosure to provide network nodes and methods therein for providing a backup NF.

According to a first aspect of the present disclosure, a method in a network node implementing an NF is provided. The method includes: transmitting, to another NF, information indicating an ID of each of one or more backup entities for one or more contexts in the NF. The information is included in a binding indication or a separate indication from the binding indication. The one or more backup entities are one or more backup NF instances or one or more backup NF service instances.

In an embodiment, the one or more backup entities may correspond to a binding level indicated in the binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the information may be carried in a 3gpp-sbi-binding header in a service request, a service response, a subscription request, a subscription response, a notification request, or a notification response.

In an embodiment, the service request, service response, subscription request, subscription response, notification request, or notification response may be transmitted to the other NF directly or via an SCP.

In an embodiment, each of the one or more backup entities may be provided with the one or more contexts.

According to a second aspect of the present disclosure, a method in a network node implementing an NF is provided. The method includes: receiving, from another NF, information indicating an ID of each of one or more backup entities for one or more contexts in the other NF. The information is included in a binding indication or a separate indication from the binding indication. The one or more backup entities are one or more backup NF instances or one or more backup NF service instances.

In an embodiment, the binding indication may contain a binding level set to NF service instance, NF service set, NF instance, or NF set, and one or more of an NF service instance ID, an NF service set ID, an NF instance ID, or an NF set ID. The method may further include, when the other NF is not available: selecting an NF service instance in an equivalent NF service set of one of the one or more backup NF instances, when the NF service set ID is contained in the binding indication and the ID of each of the one or more backup NF instances is contained in the information, or selecting an equivalent NF service instance in one of the one or more backup NF instances, when the ID of each of the one or more backup NF instances is contained in the information.

In an embodiment, the operation of selecting of the NF service instance in the equivalent NF service set of one of the one or more backup NF instances or selecting of the equivalent NF service instance in one of the one or more backup NF instances may be performed with a lower priority than: selecting an NF service instance in an NF service set indicated by the NF service set ID, when the NF service set ID is contained in the binding indication, and/or selecting an equivalent NF service instance in an NF instance indicated by the NF instance ID, when the NF instance ID is contained in the binding indication.

In an embodiment, the operation of selecting of the NF service instance in the equivalent NF service set of one of the one or more backup NF instances or selecting of the equivalent NF service instance in one of the one or more backup NF instances may be performed with a higher priority than: selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the method may further include, when the other NF is not available: selecting one of the one or more backup NF service instances when the ID of each of the one or more backup NF service instances is contained in the information.

In an embodiment, the binding indication may contain a binding level set to NF service instance, NF service set, NF instance, or NF set, and one or more of an NF service instance ID, an NF service set ID, an NF instance ID, or an NF set ID. The operation of selecting of one of the one or more backup NF service instances may be performed with a higher priority than: selecting an NF service instance in an NF service set indicated by the NF service set ID, when the NF service set ID is contained in the binding indication, selecting an equivalent NF service instance in an NF instance indicated by the NF instance ID, when the NF instance ID is contained in the binding indication, selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the one or more backup entities may correspond to a binding level indicated in the binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the method may further include, when the other NF is not available: selecting one of the one or more backup service instances, an NF service instance in one of the one or more backup NF service sets, an equivalent NF service instance in one of the one or more backup NF instances, or an equivalent NF service instance in one of the one or more backup NF sets.

In an embodiment, the binding indication may contain one or more of an NF service instance ID, an NF service set ID, an NF instance ID, or an NF set ID. The operation of selecting of one of the one or more backup service instances, the NF service instance in one of the one or more backup NF service sets, the equivalent NF service instance in one of the one or more backup NF instances, or the equivalent NF service instance in one of the one or more backup NF sets may be performed with a lower priority than: selecting an NF service instance in an NF service set indicated by the NF service set ID, when the NF service set ID is contained in the binding indication, and/or selecting an equivalent NF service instance in an NF instance indicated by the NF instance ID, when the NF instance ID is contained in the binding indication.

In an embodiment, the operation of selecting of one of the one or more backup service instances, the NF service instance in one of the one or more backup NF service sets, the equivalent NF service instance in one of the one or more backup NF instances, or the equivalent NF service instance in one of the one or more backup NF sets may be performed with a higher priority than: selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the information may be carried in a 3gpp-sbi-binding header in a service request, a service response, a subscription request, a subscription response, a notification request, or a notification response.

In an embodiment, the method may further include: transmitting the information to an SCP.

In an embodiment, the information may be included in a routing binding indication or a separate indication from the routing binding indication.

In an embodiment, the information may be carried in a 3gpp-sbi-routing-binding header in a service request, a service response, a subscription request, a subscription response, a notification request, or a notification response destined to the other NF.

In an embodiment, each of the one or more backup entities may be provided with the one or more contexts.

According to a third aspect of the present disclosure, a method in a network node implementing an SCP. The method includes: receiving, from an NF, information indicating an identifier of each of one or more backup entities for one or more contexts in another NF. The information is included in a routing binding indication or a separate indication from the routing binding indication. The one or more backup entities are one or more backup NF instances or one or more backup NF service instances.

In an embodiment, the routing binding indication may contain a binding level set to NF service instance, NF service set, NF instance, or NF set, and one or more of an NF service instance ID, an NF service set ID, an NF instance ID, or an NF set ID. The method further includes, when the other NF is not available: selecting an NF service instance in an equivalent NF service set of one of the one or more backup NF instances, when the NF service set ID is contained in the routing binding indication and the ID of each of the one or more backup NF instances is contained in the information, or selecting an equivalent NF service instance in one of the one or more backup NF instances, when the ID of each of the one or more backup NF instances is contained in the routing binding indication.

In an embodiment, the operation of selecting of the NF service instance in the equivalent NF service set of one of the one or more backup NF instances or selecting of the equivalent NF service instance in one of the one or more backup NF instances may be performed with a lower priority than: selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication.

In an embodiment, the operation of selecting of the NF service instance in the equivalent NF service set of one of the one or more backup NF instances or selecting of the equivalent NF service instance in one of the one or more backup NF instances may be performed with a higher priority than: selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the method may further include, when the other NF is not available: selecting one of the one or more backup NF service instances when the ID of each of the one or more backup NF service instances is contained in the information.

In an embodiment, the routing binding indication may contain a binding level set to NF service instance, NF service set, NF instance, or NF set, and one or more of an NF service instance ID, an NF service set ID, an NF instance ID, or an NF set ID. The operation of selecting of one of the one or more backup NF service instances may be performed with a higher priority than: selecting an NF service instance in an NF service set indicated by the NF service set ID, when the NF service set ID is contained in the routing binding indication, selecting an equivalent NF service instance in an NF instance indicated by the NF instance ID, when the NF instance ID is contained in the routing binding indication, selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the one or more backup entities may correspond to a binding level indicated in the routing binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the method may further include, when the other NF is not available: selecting one of the one or more backup service instances, an NF service instance in one of the one or more backup NF service sets, an equivalent NF service instance in one of the one or more backup NF instances, or an equivalent NF service instance in one of the one or more backup NF sets.

In an embodiment, the routing binding indication may contain one or more of an NF service instance ID, an NF service set ID, an NF instance ID, or an NF set ID.

The operation of selecting of one of the one or more backup service instances, the NF service instance in one of the one or more backup NF service sets, the equivalent NF service instance in one of the one or more backup NF instances, or the equivalent NF service instance in one of the one or more backup NF sets may be performed with a lower priority than: selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication.

In an embodiment, the operation of selecting of one of the one or more backup service instances, the NF service instance in one of the one or more backup NF service sets, the equivalent NF service instance in one of the one or more backup NF instances, or the equivalent NF service instance in one of the one or more backup NF sets may be performed with a higher priority than: selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the information may be carried in a 3gpp-sbi-routing-binding header in a service request, a service response, a subscription request, a subscription response, a notification request, or a notification response destined to the other NF.

In an embodiment, each of the one or more backup entities may be provided with the one or more contexts.

According to a fourth aspect of the present disclosure, a network node is provided. The network node includes a communication interface, a processor and a memory. The memory contains instructions executable by the processor whereby the network node is operative to, when implementing an NF, perform the method according to the above first or second aspect; or when implementing an SCP function, perform the method according to the above third aspect.

According to a fifth aspect of the present disclosure, a computer-readable storage medium is provided. The computer-readable storage medium has computer-readable instructions stored thereon, the computer-readable instructions, when executed by a processor of a network node, configure the network node to, when implementing an NF, perform the method according to the above first or second aspect; or when implementing an SCP function, perform the method according to the above third aspect.

With the embodiments of the present disclosure, an NF can transmit, to another NF (e.g., a peer NF), information indicating an ID of each of one or more backup entities for one or more contexts in the NF. In this way, the peer NF is enabled to select a backup entity specified by the NF when the NF is not available.

BRIEF DESCRIPTION OF THE DRAWINGS

The above and other objects, features and advantages will be more apparent from the following description of embodiments with reference to the figures, in which:

FIG. 1 is a flowchart illustrating a method in an NF producer according to an embodiment of the present disclosure;

FIG. 2 is a flowchart illustrating a method in an NF producer according to an embodiment of the present disclosure;

FIG. 3 is a flowchart illustrating a method in an SCP according to an embodiment of the present disclosure;

DETAILED DESCRIPTION

Figures 4, 5:
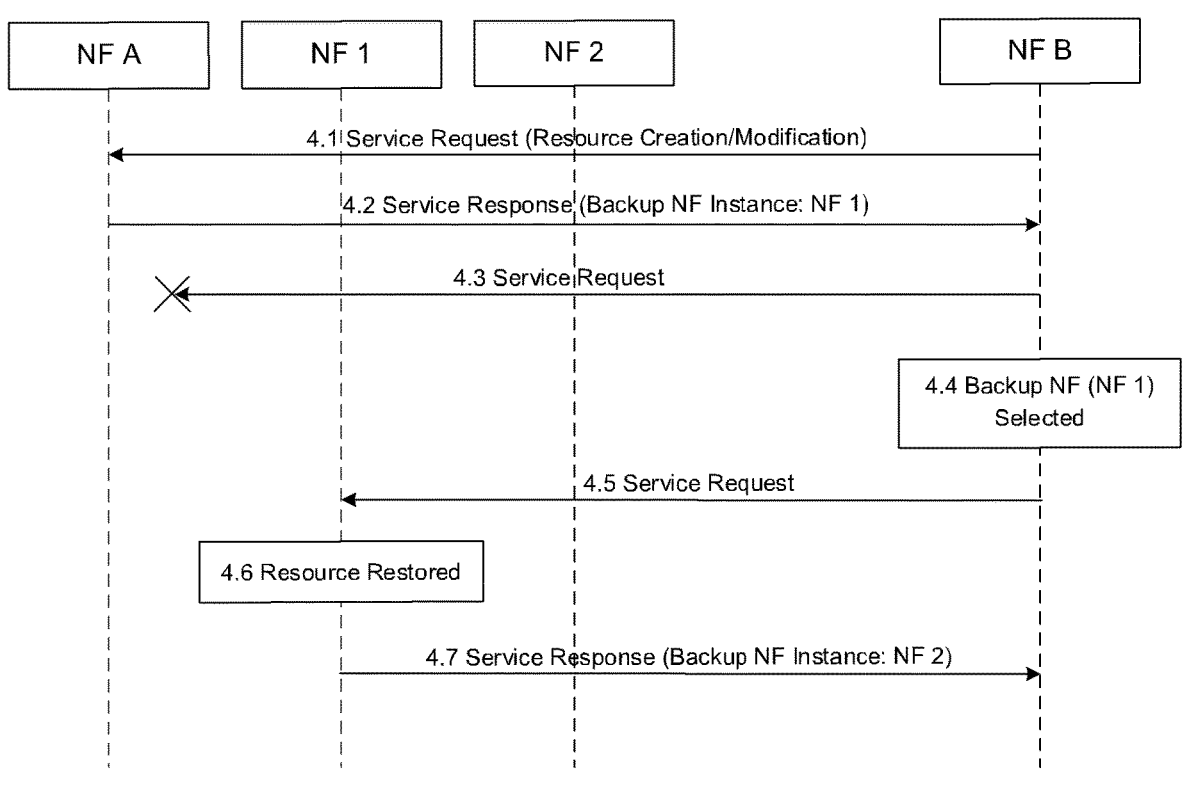
FIG. 4 is a sequence diagram showing an exemplary process for providing a backup entity ID according to an embodiment of the present disclosure.
FIG. 5 is a sequence diagram showing an exemplary process for providing a backup entity ID according to another embodiment of the present disclosure.

In the present disclosure, a network function, or NF, can be implemented either as a network element on a dedicated hardware, as a software instance running on a dedicated hardware, or as a virtualized function instantiated on an appropriate platform, e.g. on a cloud infrastructure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Since Release 15, an Access and Mobility Management Function (AMF) may specify a backup AMF per specific Global Unique AMF ID(s) (GUMAI(s)). The 5G system supports establishment of association between an AMF and 5G Access Network (AN) node. A new AMF can be added to an AMF set and an association between the AMF and the GUAMI can be created and/or updated as follows. An AMF shall be able to dynamically update an NRF with the new or updated GUAMI(s) to provide mapping between the GUAMI(s) and AMF information. The association between GUAMI(s) and AMF is published to the NRF. In addition, to deal with planned maintenance and failure, an AMF may optionally provide backup AMF information, i.e., it acts as a backup AMF if the indicated GUAMI associated AMF is unavailable. It is assumed that the backup AMF and the original AMF are in the same AMF set as they have access to the same User Equipment (UE) context. Based on that information one GUAMI is associated with an AMF, optionally with a backup AMF used for planned removal and/or another (same or different) backup AMF used for failure.

In Release 16, a binding indication can be used by an AMF to indicate the redundancy scope of a UE context. For example, an AMF can provide a binding indication of the UE context to a certain NF (e.g., a Session Management Function (SMF) during Protocol Data Unit (PDU) session establishment), but the backup AMF information cannot be indicated properly. As a result, when the AMF fails and the NF needs to reselect an alternative AMF to perform a certain service operation (e.g. N1/N2 Message Transfer), it may select another AMF within the AMF set that is different from the specified backup AMF. This behavior is not desired.

In addition to the above backup AMF, other backup NFs can be deployed. For example, in order to support geo-redundancy with n nodes as active nodes and m nodes as backup nodes, a backup node can take over and become active when an active node fails, where n and m are positive integers, e.g., n=m in a 1:1 geo-redundancy scenario. As another example, a redundancy model with memory data-base or dynamic hash table may create one or more local backup NFs within the same site, while synchronizing data with other NFs within the same set but in other sites using persistent database solution (usually with decent latency). In this case, when an NF fails, it is desired to recover service operations on a local backup NF, rather than on an NF in another site.

FIG. 1 is a flowchart illustrating a method 100 according to an embodiment of the present disclosure. The method 100 can be performed at an NF or a network node implementing an NF.

At block 110, information, referred to as "backup information" hereinafter, is transmitted to another NF, indicating an ID of each of one or more backup entities for one or more contexts in the NF. For example, a set of one or more contexts in the NF may correspond to one or more backup entities. In an example, each of the one or more backup entities may be provided with the one or more contexts, i.e., the context may be made available on each backup entity.

Here, the backup information is included in a binding indication or a separate indication from the binding indica-tion. For example, the backup information can be carried in a 3gpp-sbi-binding header in a service request, a service response, a subscription request, a subscription response, a notification request, or a notification response. Here, the service request, service response, subscription request, sub-scription response, notification request, or notification response can be transmitted to the other NF directly or via an SCP.

Here, the one or more backup entities are one or more backup NF instances or one or more backup NF service instances. For example, a new parameter, e.g., "backupn-finst" can be defined in the binding indication (in 3gpp-sbi-binding header) to carry one or more backup NF instance IDs, and/or a new parameter, e.g., "backupnfservice" can be defined in the binding indication (in 3gpp-sbi-binding header) to carry one or more backup NF service instance IDs. For example, in 3gpp-Sbi-Binding header: parametername="nfinst"/"nfset"/"nfservinst"/"nfservice-set"/"servname"/"scope"/"backupnfinst"/"backupnfser-vice".

As a non-limiting example, a backup NF service instance may be located in the same NF instance as the current NF service instance for the context(s). A backup NF instance may work independently from an NF set, i.e., a backup NF instance may be located in the same NF set as the current NF instance for the context(s), or in another NF set, or no NF set at all.

In another example, the one or more backup entities may correspond to a binding level indicated in the binding indication. For example, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets. The backup entity (entities) can provide redundancy to the binding entity at the binding level. For example, when the binding entity at the binding level is not available or not reachable, the backup entity can be selected.

In particular, the above Table 1 can be extended to include "Binding Entities" and binding entity IDs (e.g., backup NF Service Instance ID(s), backup NF Service Set ID(s), backup NF instance ID(s), or Backup NF Set ID(s)), as shown in Table 2 below.

TABLE 2

| | | | | |
|---|---|---|---|---|
| Binding, selection and reselection | | | | |
| Level of Binding Indication | The NF Consumer/ Notification sender/ SCP selects | Backup entities | The NF Consumer/ Notification sender/ SCP can reselect e.g. when selected producer is not available | Binding information for selection and re-selection |
| NF Service Instance | The indicated NF Service Instance | Backup NF Service Instance(s) | An equivalent NF Service instance: within the NF Service Set (if applicable) within the NF instance within the NF Set (if applicable) | NF Service Instance ID, Backup NF Service Instance ID(s), NF Service SET ID, NF Instance ID, NF Set ID, Service name |
| NF Service Set | Any NF Service instance within the indicated NF Service Set | Backup NF Service Set(s) | Any NF Service instance within an equivalent NF Service Set within the NF Set (if applicable) | NF Service Set ID, Backup NF Service Set ID(s), NF Instance ID, NF Set ID, Service name |
| NF Instance | Any equivalent NF Service instance within the NF instance. | Backup NF Instance(s) | Any equivalent NF Service instance within a different NF instance within the NF Set (if applicable) | NF Instance ID, Backup NF Instance ID(s), NF Set ID, Service name |

TABLE 2-continued

Binding, selection and reselection

| Level of Binding Indication | The NF Consumer/ Notification sender/ SCP selects | Backup entities | The NF Consumer/ Notification sender/ SCP can reselect e.g. when selected producer is not available | Binding information for selection and re-selection |
|---|---|---|---|---|
| NF Set | Any equivalent NF Service instance within the indicated NF Set | Backup NF Set(s) | Any equivalent NF Service instance within the NF Set | NF Set ID, Backup NF Set ID(s), Service name |

FIG. 2 is a flowchart illustrating a method 200 according to an embodiment of the present disclosure. The method 200 can be performed at an NF or a network node implementing an NF.

At block 210, information, referred to as "backup information" hereinafter, is received, from another NF, indicating an ID of each of one or more backup entities for one or more contexts in the other NF. For example, a set of one or more contexts in the NF may correspond to one or more backup entities. In an example, each of the one or more backup entities may be provided with the one or more contexts, i.e., the context may be made available on each backup entity.

Here, the backup information is included in a binding indication or a separate indication from the binding indication. For example, the backup information can be carried in a 3gpp-sbi-binding header in a service request, a service response, a subscription request, a subscription response, a notification request, or a notification response.

Here, the one or more backup entities are one or more backup NF instances or one or more backup NF service instances. For example, a new parameter, e.g., "backupnfinst" can be defined in the binding indication (in 3gpp-sbi-binding header) to carry one or more backup NF instance IDs, and/or a new parameter, e.g., "backupnfservice" can be defined in the binding indication (in 3gpp-sbi-binding header) to carry one or more backup NF service instance IDs. For example, in 3gpp-Sbi-Binding header: parametername="nfinst"/"nfset"/"nfservinst"/"nfservice-set"/"servname"/"scope"/"backupnfinst"/"backupnfser-vice".

The binding indication may contain a binding level set to NF service instance, NF service set, NF instance, or NF set, and one or more of an NF service instance ID, an NF service set ID, an NF instance ID, or an NF set ID, as shown in Table 1. When the other NF is not available, the NF may select an NF service instance in an equivalent NF service set of one of the one or more backup NF instances, when the NF service set ID is contained in the binding indication and the ID of each of the one or more backup NF instances is contained in the backup information, or select an equivalent NF service instance in one of the one or more backup NF instances, when the ID of each of the one or more backup NF instances is contained in the backup information.

For example, when the other NF is not available, the NF may (re)select an NF service instance in the following decreasing order of priority:

select an NF service instance in an NF service set indicated by the NF service set ID, when the NF service set ID is contained in the binding indication, select an equivalent NF service instance in an NF instance indicated by the NF instance ID, when the NF instance ID is contained in the binding indication, select an NF service instance in an equivalent NF service set of one of the one or more backup NF instances, when the NF service set ID is contained in the binding indication and the ID of each of the one or more backup NF instances is contained in the backup information, select an equivalent NF service instance in one of the one or more backup NF instances, when the ID of each of the one or more backup NF instances is contained in the backup information, select an NF service instance in an equivalent NF service set of another NF instance of the NF set, when the NF service set ID and the NF set ID are contained in the binding indication, select an equivalent NF service instance in another NF instance of the NF set, when the NF set ID is contained in the binding indication.

Alternatively, when the other NF is not available, the NF may select one of the one or more backup NF service instances when the ID of each of the one or more backup NF service instances is contained in the backup information. For example, when the other NF is not available, the NF may (re)select an NF service instance in the following decreasing order of priority:

select one of the one or more backup NF service instances when the ID of each of the one or more backup NF service instances is contained in the backup information, select an NF service instance in an NF service set indicated by the NF service set ID, when the NF service set ID is contained in the binding indication, select an equivalent NF service instance in an NF instance indicated by the NF instance ID, when the NF instance ID is contained in the binding indication, select an NF service instance in an equivalent NF service set of another NF instance of the NF set, when the NF service set ID and the NF set ID are contained in the binding indication, select an equivalent NF service instance in another NF instance of the NF set, when the NF set ID is contained in the binding indication.

In another example, the one or more backup entities may correspond to a binding level indicated in the binding indication. For example, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets, as shown in the above Table 2.

When the other NF is not available, the NF may select one of the one or more backup service instances, an NF service instance in one of the one or more backup NF service sets, an equivalent NF service instance in one of the one or more backup NF instances, or an equivalent NF service instance in one of the one or more backup NF sets.

The binding indication may contain a binding level set to NF service instance, NF service set, NF instance, or NF set, and one or more of an NF service instance ID, an NF service set ID, an NF instance ID, or an NF set ID, as shown in Table 2. In a reselection process when the other NF is not available, the third column in Table 2, i.e., "Backup Entities", may be selected with a lower priority than the second column, but with a higher priority than the fourth column. For example, when the other NF is not available, the NF may (re)select an NF service instance in the following decreasing order of priority:

select an NF service instance in an NF service set indicated by the NF service set ID, when the NF service set ID is contained in the binding indication, select an equivalent NF service instance in an NF instance indicated by the NF instance ID, when the NF instance ID is contained in the binding indication, select one of the one or more backup service instances, an NF service instance in one of the one or more backup NF service sets, an equivalent NF service instance in one of the one or more backup NF instances, or an equivalent NF service instance in one of the one or more backup NF sets, select an NF service instance in an equivalent NF service set of another NF instance of the NF set, when the NF service set ID and the NF set ID are contained in the binding indication, select an equivalent NF service instance in another NF instance of the NF set, when the NF set ID is contained in the binding indication.

In an example, the backup information can be transmitted to an SCP, e.g., in a routing binding indication or a separate indication from the routing binding indication. For example, the backup information may be carried in a 3gpp-sbi-routing-binding header in a service request, a service response, a subscription request, a subscription response, a notification request, or a notification response destined to the other NF. Here, the 3gpp-sbi-routing-binding header can be a copy of the 3gpp-sbi-binding header and may also contain the backup information.

FIG. 3 is a flowchart illustrating a method 300 according to an embodiment of the present disclosure. The method 300 can be performed at an SCP or a network node implementing an SCP.

At block 310, information, referred to as "backup information" hereinafter, received, from an NF, indicating an ID of each of one or more backup entities for one or more contexts in another NF. For example, a set of one or more contexts in the NF may correspond to one or more backup entities. In an example, each of the one or more backup entities may be provided with the one or more contexts, i.e., the context may be made available on each backup entity.

Here, the backup information is included in a routing binding indication or a separate indication from the routing binding indication. For example, the backup information may be carried in a 3gpp-sbi-routing-binding header in a service request, a service response, a subscription request, a subscription response, a notification request, or a notification response destined to the other NF.

Here, the one or more backup entities are one or more backup NF instances or one or more backup NF service instances. For example, a new parameter, e.g., "backupnfinst" can be defined in the routing binding indication (in 3gpp-sbi-routing-binding header) to carry one or more backup NF instance IDs, and/or a new parameter, e.g., "backupnfservice" can be defined in the routing binding indication (in 3gpp-sbi-binding header) to carry one or more backup NF service instance IDs. For example, in 3gpp-Sbi-Routing-Binding header:
parametername="nfinst"/"nfset"/"nfservinst"/"nfservice-set"/"servname"/"backupnfinst"/"backupnfservice".

The routing binding indication may contain a binding level set to NF service instance, NF service set, NF instance, or NF set, and one or more of an NF service instance ID, an NF service set ID, an NF instance ID, or an NF set ID, as shown in Table 1. When the other NF is not available, the SCP may select an NF service instance in an equivalent NF service set of one of the one or more backup NF instances, when the NF service set ID is contained in the routing binding indication and the ID of each of the one or more backup NF instances is contained in the backup information, or select an equivalent NF service instance in one of the one or more backup NF instances, when the ID of each of the one or more backup NF instances is contained in the backup information.

For example, when the other NF is not available, the SCP may (re)select an NF service instance in the following decreasing order of priority:

select an NF service instance in an NF service set indicated by the NF service set ID, when the NF service set ID is contained in the routing binding indication, select an equivalent NF service instance in an NF instance indicated by the NF instance ID, when the NF instance ID is contained in the routing binding indication, select an NF service instance in an equivalent NF service set of one of the one or more backup NF instances, when the NF service set ID is contained in the routing binding indication and the ID of each of the one or more backup NF instances is contained in the backup information, select an equivalent NF service instance in one of the one or more backup NF instances, when the ID of each of the one or more backup NF instances is contained in the backup information, select an NF service instance in an equivalent NF service set of another NF instance of the NF set, when the NF service set ID and the NF set ID are contained in the routing binding indication, select an equivalent NF service instance in another NF instance of the NF set, when the NF set ID is contained in the routing binding indication.

Alternatively, when the other NF is not available, the SCP may select one of the one or more backup NF service instances when the ID of each of the one or more backup NF service instances is contained in the backup information. For example, when the other NF is not available, the SCP may (re)select an NF service instance in the following decreasing order of priority:

select one of the one or more backup NF service instances when the ID of each of the one or more backup NF service instances is contained in the backup information, select an NF service instance in an NF service set indicated by the NF service set ID, when the NF service set ID is contained in the routing binding indication, select an equivalent NF service instance in an NF instance indicated by the NF instance ID, when the NF instance ID is contained in the routing binding indication, select an NF service instance in an equivalent NF service set of another NF instance of the NF set, when the NF service set ID and the NF set ID are contained in the routing binding indication, select an equivalent NF service instance in another NF instance of the NF set, when the NF set ID is contained in the routing binding indication.

In another example, the one or more backup entities may correspond to a binding level indicated in the routing binding indication. For example, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets, as shown in the above Table 2.

When the other NF is not available, the SCP may select one of the one or more backup service instances, an NF service instance in one of the one or more backup NF service sets, an equivalent NF service instance in one of the one or more backup NF instances, or an equivalent NF service instance in one of the one or more backup NF sets.

The routing binding indication may contain a binding level set to NF service instance, NF service set, NF instance, or NF set, and one or more of an NF service instance ID, an NF service set ID, an NF instance ID, or an NF set ID, as shown in Table 2. In a reselection process when the other NF is not available, the third column in Table 2, i.e., "Backup Entities", may be selected with a lower priority than the second column, but with a higher priority than the fourth column. For example, when the other NF is not available, the SCP may (re)select an NF service instance in the following decreasing order of priority:

select an NF service instance in an NF service set indicated by the NF service set ID, when the NF service set ID is contained in the routing binding indication, select an equivalent NF service instance in an NF instance indicated by the NF instance ID, when the NF instance ID is contained in the routing binding indication, select one of the one or more backup service instances, an NF service instance in one of the one or more backup NF service sets, an equivalent NF service instance in one of the one or more backup NF instances, or an equivalent NF service instance in one of the one or more backup NF sets, select an NF service instance in an equivalent NF service set of another NF instance of the NF set, when the NF service set ID and the NF set ID are contained in the routing binding indication, select an equivalent NF service instance in another NF instance of the NF set, when the NF set ID is contained in the routing binding indication.

In the following, the above methods 100-300 will be further explained with reference to illustrative examples shown in FIGS. 4-5.

FIG. 4 is a sequence diagram showing an exemplary process for providing a backup entity ID according to an embodiment of the present disclosure.

At 4.1, NF B transmits to NF A a service request for creation or modification of a resource. At 4.2, NF A transmits to NF B a service response containing a 3gpp-Sbi-Binding header with a binding indication: bl=nf-set; nfset=NF-Set1-ID; backupnfinst=NF1-Instance-ID, where NF-Set1-ID is an NF set ID of an NF set (NF Set 1 in this case), NF1-Instance-ID is an NF instance ID of a backup NF instance (NF 1 in this case), and NF A and NF 1 belong to NF Set 1. At 4.3, NF B transmits a subsequent service request to NF A, but finds NF A not available. In this case, at 4.4, NF B reselects an NF service instance in an equivalent NF service set of the backup NF instance (NF 1). At 4.5, NF B transmits a service request to NF 1, and the resource is restored at NF 1 at 4.6. At 4.7, NF 1 transmits to NF B a service response containing a 3gpp-Sbi-Binding header with a binding indication: bl=nf-set; nfset=NF-Set1-ID; backupnfinst=NF2-Instance-ID, where NF2-Instance-ID is an NF instance ID of a backup NF instance (NF 2 in this case), and NF 2 belongs to NF Set 1.

FIG. 5 is a sequence diagram showing an exemplary process for providing a backup entity ID according to an embodiment of the present disclosure.

At 5.1, NF B transmits to NF A, via an SCP, a service request for creation or modification of a resource. At 5.2, NF A transmits to NF B, via the SCP, a service response containing a 3gpp-Sbi-Binding header with a binding indication: bl=nf-set; nfset=NF-Set1-ID; backupnfinst=NF1-Instance-ID, where NF-Set1-ID is an NF set ID of an NF set (NF Set 1 in this case), NF1-Instance-ID is an NF instance ID of a backup NF instance (NF 1 in this case), and NF A and NF 1 belong to NF Set 1. At 5.3, NF B transmits a subsequent service request to the SCP for forwarding to NF A, the service request containing a 3gpp-Sbi-Routing-Binding header with a routing binding indication: bl=nf-set; nfset=NF-Set1-ID; backupnfinst=NF1-Instance-ID, but the SCP finds NF A not available. In this case, at 5.4, the SCP reselects an NF service instance in an equivalent NF service set of the backup NF instance (NF 1). At 5.5, the SCP transmits a service request to NF 1, and the resource is restored at NF 1 at 5.6. At 5.7, NF 1 transmits to NF B, via the SCP, a service response containing a 3gpp-Sbi-Binding header with a binding indication: bl=nf-set; nfset=NF-Set1-ID; backupnfinst=NF2-Instance-ID, where NF2-Instance-ID is an NF instance ID of a backup NF instance (NF 2 in this case), and NF 2 belongs to NF Set 1.

Figure 6:
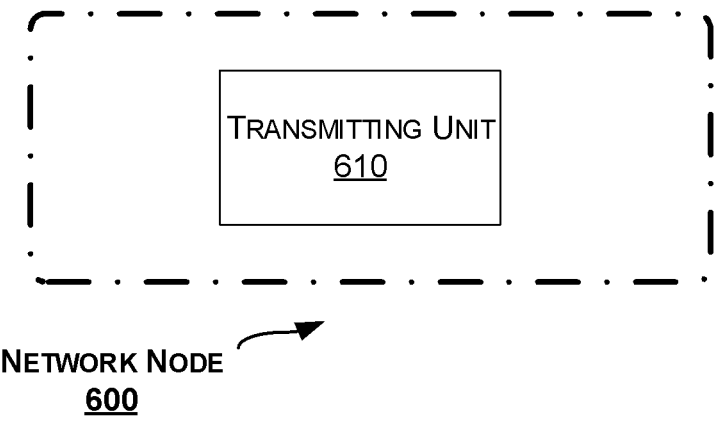
FIG. 6 is a block diagram of a network node according to an embodiment of the present disclosure.

Correspondingly to the method 100 as described above, a network node is provided. FIG. 6 is a block diagram of a network node 600 according to an embodiment of the present disclosure. The network node 600 can be configured to implement an NF.

As shown in FIG. 6, the network node 600 includes a transmitting unit 610 configured to transmit, to another NF, information indicating an ID of each of one or more backup entities for one or more contexts in the NF. The information is included in a binding indication or a separate indication from the binding indication. The one or more backup entities are one or more backup NF instances or one or more backup NF service instances.

In an embodiment, the one or more backup entities may correspond to a binding level indicated in the binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the information may be carried in a 3gpp-sbi-binding header in a service request, a service response, a subscription request, a subscription response, a notification request, or a notification response.

In an embodiment, the service request, service response, subscription request, subscription response, notification request, or notification response may be transmitted to the other NF directly or via an SCP.

In an embodiment, each of the one or more backup entities may be provided with the one or more contexts.

The unit 610 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 7:
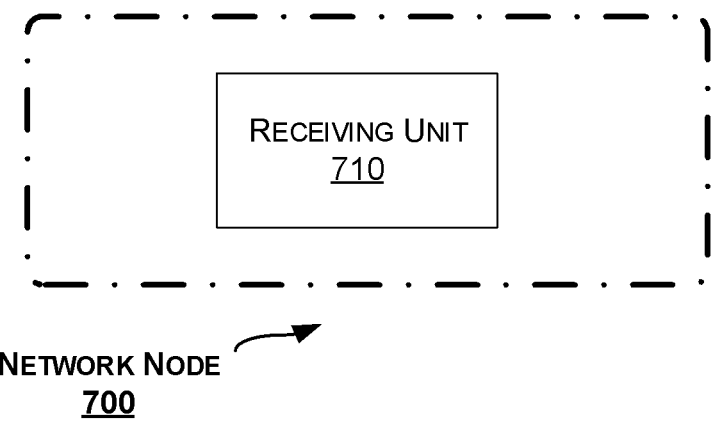
FIG. 7 is a block diagram of a network node according to an embodiment of the present disclosure.

Correspondingly to the method 200 as described above, a network node is provided. FIG. 7 is a block diagram of a network node 700 according to an embodiment of the present disclosure. The network node 700 can be configured to implement an NF.

As shown in FIG. 7, the network node 700 includes a receiving unit 710 configured to receive, from another NF, information indicating an ID of each of one or more backup entities for one or more contexts in the other NF. The information is included in a binding indication or a separate indication from the binding indication. The one or more backup entities are one or more backup NF instances or one or more backup NF service instances.

In an embodiment, the binding indication may contain a binding level set to NF service instance, NF service set, NF instance, or NF set, and one or more of an NF service instance ID, an NF service set ID, an NF instance ID, or an NF set ID. The network node 700 may further include a selecting unit configured to, when the other NF is not available: select an NF service instance in an equivalent NF service set of one of the one or more backup NF instances, when the NF service set ID is contained in the binding indication and the ID of each of the one or more backup NF instances is contained in the information, or select an equivalent NF service instance in one of the one or more backup NF instances, when the ID of each of the one or more backup NF instances is contained in the information.

In an embodiment, the selecting unit can be configured to select the NF service instance in the equivalent NF service set of one of the one or more backup NF instances or select the equivalent NF service instance in one of the one or more backup NF instances with a lower priority than: selecting an NF service instance in an NF service set indicated by the NF service set ID, when the NF service set ID is contained in the binding indication, and/or selecting an equivalent NF service instance in an NF instance indicated by the NF instance ID, when the NF instance ID is contained in the binding indication.

In an embodiment, the selecting unit can be configured to select the NF service instance in the equivalent NF service set of one of the one or more backup NF instances or select the equivalent NF service instance in one of the one or more backup NF instances with a higher priority than: selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the network node 700 may further include a selecting unit configured to, when the other NF is not available: select one of the one or more backup NF service instances when the ID of each of the one or more backup NF service instances is contained in the information.

In an embodiment, the binding indication may contain a binding level set to NF service instance, NF service set, NF instance, or NF set, and one or more of an NF service instance ID, an NF service set ID, an NF instance ID, or an NF set ID. The selecting unit can be configured to select of one of the one or more backup NF service instances with a higher priority than: selecting an NF service instance in an NF service set indicated by the NF service set ID, when the NF service set ID is contained in the binding indication, selecting an equivalent NF service instance in an NF instance indicated by the NF instance ID, when the NF instance ID is contained in the binding indication, selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the one or more backup entities may correspond to a binding level indicated in the binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the network node 700 may further include a selecting unit configured to, when the other NF is not available: select one of the one or more backup service instances, an NF service instance in one of the one or more backup NF service sets, an equivalent NF service instance in one of the one or more backup NF instances, or an equivalent NF service instance in one of the one or more backup NF sets.

In an embodiment, the binding indication may contain one or more of an NF service instance ID, an NF service set ID, an NF instance ID, or an NF set ID. The selecting unit can be configured to select one of the one or more backup service instances, the NF service instance in one of the one or more backup NF service sets, the equivalent NF service instance in one of the one or more backup NF instances, or the equivalent NF service instance in one of the one or more backup NF sets with a lower priority than: selecting an NF service instance in an NF service set indicated by the NF service set ID, when the NF service set ID is contained in the binding indication, and/or selecting an equivalent NF service instance in an NF instance indicated by the NF instance ID, when the NF instance ID is contained in the binding indication.

In an embodiment, the selecting unit can be configured to select one of the one or more backup service instances, the NF service instance in one of the one or more backup NF service sets, the equivalent NF service instance in one of the one or more backup NF instances, or the equivalent NF service instance in one of the one or more backup NF sets with a higher priority than: selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the information may be carried in a 3gpp-sbi-binding header in a service request, a service response, a subscription request, a subscription response, a notification request, or a notification response.

In an embodiment, the network node 700 may further include a transmitting unit configured to transmit the information to an SCP.

In an embodiment, the information may be included in a routing binding indication or a separate indication from the routing binding indication.

In an embodiment, the information may be carried in a 3gpp-sbi-routing-binding header in a service request, a service response, a subscription request, a subscription response, a notification request, or a notification response destined to the other NF.

In an embodiment, each of the one or more backup entities may be provided with the one or more contexts.

The unit 710 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 8:
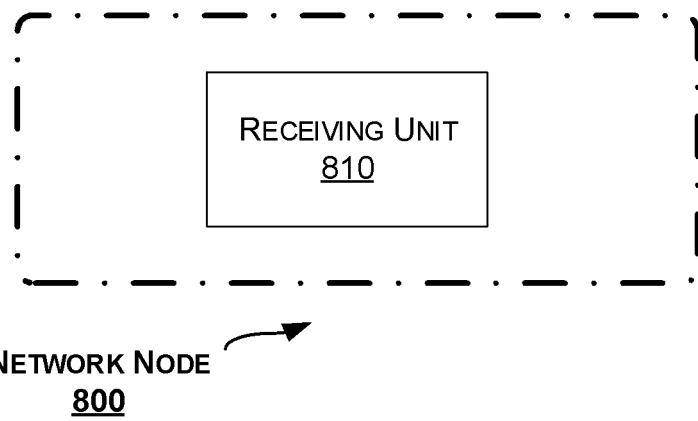
FIG. 8 is a block diagram of a network node according to an embodiment of the present disclosure.

Correspondingly to the method 300 as described above, a network node is provided. FIG. 8 is a block diagram of a network node 800 according to an embodiment of the present disclosure. The network node 800 can be configured to implement an SCP.

As shown in FIG. 8, the network node 800 includes a receiving unit 810 configured to receive, from an NF, information indicating an identifier of each of one or more backup entities for one or more contexts in another NF. The information is included in a routing binding indication or a separate indication from the routing binding indication. The one or more backup entities are one or more backup NF instances or one or more backup NF service instances.

In an embodiment, the routing binding indication may contain a binding level set to NF service instance, NF service set, NF instance, or NF set, and one or more of an NF service instance ID, an NF service set ID, an NF instance ID, or an NF set ID. The network node 800 may further include a selecting unit configured to, when the other NF is not available: select an NF service instance in an equivalent NF service set of one of the one or more backup NF instances, when the NF service set ID is contained in the routing binding indication and the ID of each of the one or more backup NF instances is contained in the information, or select an equivalent NF service instance in one of the one or more backup NF instances, when the ID of each of the one or more backup NF instances is contained in the routing binding indication.

In an embodiment, the selecting unit can be configured to select the NF service instance in the equivalent NF service set of one of the one or more backup NF instances or select the equivalent NF service instance in one of the one or more backup NF instances with a lower priority than: selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication.

In an embodiment, the selecting unit can be configured to select the NF service instance in the equivalent NF service set of one of the one or more backup NF instances or select of the equivalent NF service instance in one of the one or more backup NF instances with a higher priority than: selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the network node 800 may further include a selecting unit configured to, when the other NF is not available: select one of the one or more backup NF service instances when the ID of each of the one or more backup NF service instances is contained in the information.

In an embodiment, the routing binding indication may contain a binding level set to NF service instance, NF service set, NF instance, or NF set, and one or more of an NF service instance ID, an NF service set ID, an NF instance ID, or an NF set ID. The selecting unit can be configured to select one of the one or more backup NF service instances with a higher priority than: selecting an NF service instance in an NF service set indicated by the NF service set ID, when the NF service set ID is contained in the routing binding indication, selecting an equivalent NF service instance in an NF instance indicated by the NF instance ID, when the NF instance ID is contained in the routing binding indication, selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the one or more backup entities may correspond to a binding level indicated in the routing binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the network node 800 may further include a selecting unit configured to, when the other NF is not available: select one of the one or more backup service instances, an NF service instance in one of the one or more backup NF service sets, an equivalent NF service instance in one of the one or more backup NF instances, or an equivalent NF service instance in one of the one or more backup NF sets.

In an embodiment, the routing binding indication may contain one or more of an NF service instance ID, an NF service set ID, an NF instance ID, or an NF set ID. The selecting unit can be configured to select one of the one or more backup service instances, the NF service instance in one of the one or more backup NF service sets, the equivalent NF service instance in one of the one or more backup NF instances, or the equivalent NF service instance in one of the one or more backup NF sets with a lower priority than: selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication.

In an embodiment, the selecting unit can be configured to select one of the one or more backup service instances, the NF service instance in one of the one or more backup NF service sets, the equivalent NF service instance in one of the one or more backup NF instances, or the equivalent NF service instance in one of the one or more backup NF sets with a higher priority than: selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the information may be carried in a 3gpp-sbi-routing-binding header in a service request, a service response, a subscription request, a subscription response, a notification request, or a notification response destined to the other NF.

In an embodiment, each of the one or more backup entities may be provided with the one or more contexts.

The unit 810 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 9:
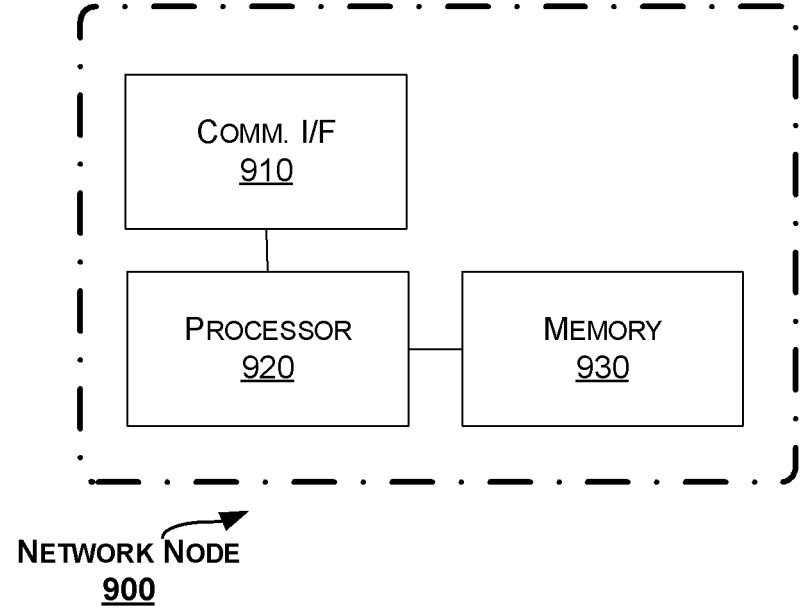
FIG. 9 is a block diagram of a network node according to another embodiment of the present disclosure.

FIG. 9 is a block diagram of a network node 900 according to another embodiment of the present disclosure.

The network node 900 includes a communication interface 910, a processor 920 and a memory 930.

The memory 930 may contain instructions executable by the processor 920 whereby the network node 900 is operative to, when implementing an NF, perform the actions, e.g., of the procedure described earlier in conjunction with FIG. 1. Particularly, the memory 930 may contain instructions executable by the processor 920 whereby the network node 900 is operative to, when implementing an NF: transmit, to another NF, information indicating an ID of each of one or more backup entities for one or more contexts in the NF. The information is included in a binding indication or a separate indication from the binding indication. The one or more backup entities are one or more backup NF instances or one or more backup NF service instances.

In an embodiment, the one or more backup entities may correspond to a binding level indicated in the binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the information may be carried in a 3gpp-sbi-binding header in a service request, a service response, a subscription request, a subscription response, a notification request, or a notification response.

In an embodiment, the service request, service response, subscription request, subscription response, notification request, or notification response may be transmitted to the other NF directly or via an SCP.

In an embodiment, each of the one or more backup entities may be provided with the one or more contexts.

Alternatively, the memory 930 may contain instructions executable by the processor 920 whereby the network node 900 is operative to, when implementing an NF, perform the actions, e.g., of the procedure described earlier in conjunction with FIG. 2. Particularly, the memory 930 may contain instructions executable by the processor 920 whereby the network node 900 is operative to, when implementing an NF: receive, from another NF, information indicating an ID of each of one or more backup entities for one or more contexts in the other NF. The information is included in a binding indication or a separate indication from the binding indication. The one or more backup entities are one or more backup NF instances or one or more backup NF service instances.

In an embodiment, the binding indication may contain a binding level set to NF service instance, NF service set, NF instance, or NF set, and one or more of an NF service instance ID, an NF service set ID, an NF instance ID, or an NF set ID.

The memory 930 may further contain instructions executable by the processor 920 whereby the network node 900 is operative to, when the other NF is not available: select an NF service instance in an equivalent NF service set of one of the one or more backup NF instances, when the NF service set ID is contained in the binding indication and the ID of each of the one or more backup NF instances is contained in the information, or select an equivalent NF service instance in one of the one or more backup NF instances, when the ID of each of the one or more backup NF instances is contained in the information.

In an embodiment, the operation of selecting of the NF service instance in the equivalent NF service set of one of the one or more backup NF instances or selecting of the equivalent NF service instance in one of the one or more backup NF instances may be performed with a lower priority than: selecting an NF service instance in an NF service set indicated by the NF service set ID, when the NF service set ID is contained in the binding indication, and/or selecting an equivalent NF service instance in an NF instance indicated by the NF instance ID, when the NF instance ID is contained in the binding indication.

In an embodiment, the operation of selecting of the NF service instance in the equivalent NF service set of one of the one or more backup NF instances or selecting of the equivalent NF service instance in one of the one or more backup NF instances may be performed with a higher priority than: selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the memory 930 may further contain instructions executable by the processor 920 whereby the network node 900 is operative to, when the other NF is not available: select one of the one or more backup NF service instances when the ID of each of the one or more backup NF service instances is contained in the information.

In an embodiment, the binding indication may contain a binding level set to NF service instance, NF service set, NF instance, or NF set, and one or more of an NF service instance ID, an NF service set ID, an NF instance ID, or an NF set ID. The operation of selecting of one of the one or more backup NF service instances may be performed with a higher priority than: selecting an NF service instance in an NF service set indicated by the NF service set ID, when the NF service set ID is contained in the binding indication, selecting an equivalent NF service instance in an NF instance indicated by the NF instance ID, when the NF instance ID is contained in the binding indication, selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the one or more backup entities may correspond to a binding level indicated in the binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the memory 930 may further contain instructions executable by the processor 920 whereby the network node 900 is operative to, when the other NF is not available: select one of the one or more backup service instances, an NF service instance in one of the one or more backup NF service sets, an equivalent NF service instance in one of the one or more backup NF instances, or an equivalent NF service instance in one of the one or more backup NF sets.

In an embodiment, the binding indication may contain one or more of an NF service instance ID, an NF service set ID, an NF instance ID, or an NF set ID. The operation of selecting of one of the one or more backup service instances, the NF service instance in one of the one or more backup NF service sets, the equivalent NF service instance in one of the one or more backup NF instances, or the equivalent NF service instance in one of the one or more backup NF sets may be performed with a lower priority than: selecting an NF service instance in an NF service set indicated by the NF service set ID, when the NF service set ID is contained in the binding indication, and/or selecting an equivalent NF service instance in an NF instance indicated by the NF instance ID, when the NF instance ID is contained in the binding indication.

In an embodiment, the operation of selecting of one of the one or more backup service instances, the NF service instance in one of the one or more backup NF service sets, the equivalent NF service instance in one of the one or more backup NF instances, or the equivalent NF service instance in one of the one or more backup NF sets may be performed with a higher priority than: selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

In an embodiment, the information may be carried in a 3gpp-sbi-binding header in a service request, a service response, a subscription request, a subscription response, a notification request, or a notification response.

In an embodiment, the memory 930 may further contain instructions executable by the processor 920 whereby the network node 900 is operative to, transmit the information to an SCP.

In an embodiment, the information may be included in a routing binding indication or a separate indication from the routing binding indication.

In an embodiment, the information may be carried in a 3gpp-sbi-routing-binding header in a service request, a service response, a subscription request, a subscription response, a notification request, or a notification response destined to the other NF.

In an embodiment, each of the one or more backup entities may be provided with the one or more contexts.

Alternatively, the memory 930 may contain instructions executable by the processor 920 whereby the network node 900 is operative to, when implementing an SCP, perform the actions, e.g., of the procedure described earlier in conjunction with FIG. 3. Particularly, the memory 930 may contain instructions executable by the processor 920 whereby the network node 900 is operative to, when implementing an SCP: receive, from an NF, information indicating an identifier of each of one or more backup entities for one or more contexts in another NF. The information is included in a routing binding indication or a separate indication from the routing binding indication. The one or more backup entities are one or more backup NF instances or one or more backup NF service instances.

In an embodiment, the routing binding indication may contain a binding level set to NF service instance, NF service set, NF instance, or NF set, and one or more of an NF service instance ID, an NF service set ID, an NF instance ID, or an NF set ID. The memory 930 may further contain instructions executable by the processor 920 whereby the network node 900 is operative to, when the other NF is not available: select an NF service instance in an equivalent NF service set of one of the one or more backup NF instances, when the NF service set ID is contained in the routing binding indication and the ID of each of the one or more backup NF instances is contained in the information, or select an equivalent NF service instance in one of the one or more backup NF instances, when the ID of each of the one or more backup NF instances is contained in the routing binding indication.

In an embodiment, the operation of selecting of the NF service instance in the equivalent NF service set of one of the one or more backup NF instances or selecting of the equivalent NF service instance in one of the one or more backup NF instances may be performed with a lower priority than: selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication.

In an embodiment, the operation of selecting of the NF service instance in the equivalent NF service set of one of the one or more backup NF instances or selecting of the equivalent NF service instance in one of the one or more backup NF instances may be performed with a higher priority than: selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the memory 930 may further contain instructions executable by the processor 920 whereby the network node 900 is operative to, when the other NF is not available: select one of the one or more backup NF service instances when the ID of each of the one or more backup NF service instances is contained in the information.

In an embodiment, the routing binding indication may contain a binding level set to NF service instance, NF service set, NF instance, or NF set, and one or more of an NF service instance ID, an NF service set ID, an NF instance ID, or an NF set ID. The operation of selecting of one of the one or more backup NF service instances may be performed with a higher priority than: selecting an NF service instance in an NF service set indicated by the NF service set ID, when the NF service set ID is contained in the routing binding indication, selecting an equivalent NF service instance in an NF instance indicated by the NF instance ID, when the NF instance ID is contained in the routing binding indication, selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the one or more backup entities may correspond to a binding level indicated in the routing binding indication.

In an embodiment, the binding level may be set to NF service instance and the one or more backup entities may be one or more backup service instances, the binding level may be set to NF service set and the one or more backup entities may be one or more backup NF service sets, the binding level may be set to NF instance and the one or more backup entities may be one or more backup NF instances, or the binding level may be set to NF set and the one or more backup entities may be one or more backup NF sets.

In an embodiment, the memory 930 may further contain instructions executable by the processor 920 whereby the network node 900 is operative to, when the other NF is not available: select one of the one or more backup service instances, an NF service instance in one of the one or more backup NF service sets, an equivalent NF service instance in one of the one or more backup NF instances, or an equivalent NF service instance in one of the one or more backup NF sets.

In an embodiment, the routing binding indication may contain one or more of an NF service instance ID, an NF service set ID, an NF instance ID, or an NF set ID. The operation of selecting of one of the one or more backup service instances, the NF service instance in one of the one or more backup NF service sets, the equivalent NF service instance in one of the one or more backup NF instances, or the equivalent NF service instance in one of the one or more backup NF sets may be performed with a lower priority than: selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication.

In an embodiment, the operation of selecting of one of the one or more backup service instances, the NF service instance in one of the one or more backup NF service sets, the equivalent NF service instance in one of the one or more backup NF instances, or the equivalent NF service instance in one of the one or more backup NF sets may be performed with a higher priority than: selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

In an embodiment, the information may be carried in a 3gpp-sbi-routing-binding header in a service request, a service response, a subscription request, a subscription response, a notification request, or a notification response destined to the other NF.

In an embodiment, each of the one or more backup entities may be provided with the one or more contexts.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 920 causes the network node 900 to perform the actions, e.g., of the procedure described earlier in conjunction with FIG. 1, 2, or 3.

The computer program product may be configured as a computer program code structured in computer program modules. The computer program modules could essentially perform the actions of the flow illustrated in FIG. 1, 2, or 3.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried in a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The present disclosure further comprises the following embodiments based on the 3GPP TS 29.500.

5.2.3.2.5 3gpp-Sbi-Routing-Binding

This header contains a Routing Binding Indication used to direct a service request to an HTTP server which has the targeted NF service resource context (see clause 6.12).

The encoding of the header follows the ABNF as defined in IETF RFC 7230 [12].

3gpp-Sbi-Routing-Binding="3gpp-Sbi-Routing-Binding"
    ":" OWS "bl=" blvalue 1*(";" OWS parameter)
blvalue="nf-instance"/"nf-set"/"nfservice-instance"/"nfser-
    vice-set"
parameter=parametername "=" token
parametername="nfinst"/"nfset"/"nfservinst"/"nfservice-
    set"/"servname"/"backupnfinst"

The following parameters are defined:

bl (binding level): the value of this parameter (blvalue) indicates a preferred binding to a binding entity, i.e. either to an NF Instance, an NF set, an NF Service Instance or an NF Service Set. If the binding level is set to an NF Service Instance (nfservice-instance), then either NF Service Set ID or NF Instance ID shall also be present to unambiguously identify the NF Service Instance.

nfinst (NF instance): indicates an NF Instance ID, as defined in clause 5.2.2.2.2 in 3GPP TS 29.510 [8]. This parameter shall be present if the binding level is set to "nf-instance", or if the binding level is set to "nfservice-instance" and the nfserviceset parameter is not included.

nfset (NF set): indicates an NF Set ID, as defined in clause 28.12 in 3GPP TS 23.003 [15]. This parameter shall be present if the binding level is set to "nf-set". It may be present otherwise (see clause 6.12.1).

nfservinst (NF service instance): indicates an NF Service Instance ID. This parameter shall be present if the binding level is set to "nfservice-instance".

nfserviceset (NF service set): indicates an NF Service Set ID as defined in clause 28.13 in 3GPP TS 23.003 [15]. This parameter shall be present if the binding level is set to "nfservice-set". It may be present if the binding level is set to "nfservice-instance" (see clause 6.12.1).

servname (service name): indicates the name of a service, as defined in 3GPP TS 29.510 [8], or a custom service that handles a notification or a callback request. It may be present in a Routing Binding Indication in a notification or a callback request.

backupnfinst (backup NF Instance): indicates the NF Instance ID (as defined in clause 5.2.2.2.2 in 3GPP TS 29.510 [8]) of the backup NF (e.g. the backup AMF as specified in 3GPP TS 23.501 [3]).

See clause 3.2.6 of IETF RFC 7230 for the "token" type definition. A token's value is a string, which contains a binding entity ID or a service name.

EXAMPLE 1

Binding to SMF set 1 of MCC 345 and MNC 012:

3gpp-Sbi-Routing-Binding: bl=nf-set; nfset=setl.smfset.5gc.mnc012.mcc345

EXAMPLE 2

Binding to an SMF instance within SMF set of Example 1:

3gpp-Sbi-Routing-Binding: bl=nf-instance; nfinst=54804518-4191-46b3-955c-ac631f953ed8; nfset=setl. smfset.5gc.mnc012.mcc345

EXAMPLE 3

Binding to a SMF service set "xyz" within an SMF instance within SMF set of Example 1:

3gpp-Sbi-Routing-Binding: bl=nfservice-set; nfservset=setxyz. snnsmf-pdusession.nfi54804518-4191-46b3-955c-ac631f953ed8.5gc.mn c012.mcc345; nfset=setl.smfset.5gc.mnc012.mcc345

EXAMPLE 4

Binding to AMF set 1 within AMF region 48 (hexadecimal):

3gpp-Sbi-Routing-Binding: bl=nf-set; nfset=setl.region48.amfset.5gc.mnc012.mcc345

EXAMPLE 5

Binding for a subscription (i.e. notification requests) to AMF set 1 within AMF region 48 (hexadecimal) and Namf_Communication service:

3gpp-Sbi-Routing-Binding: bl=nf-set; nfset=setl.region48.amfset.5gc.mnc012.mcc345; servname=namf-comm

EXAMPLE 6

Binding to AMF set 1 within AMF region 48 (hexadecimal) with backup AMF

3gpp-Sbi-Routing-Binding: bl=nf-set; nfset=set1.region48.amfset.5gc.mnc012.mcc345; backupnfinst=54804518-4191-46b3-955c-ac6311953ed8

5.2.3.2.6 3gpp-Sbi-Binding

This header contains a comma-delimited list of Binding Indications from an HTTP server for storage and subsequent use by an HTTP client (see clause 6.12).

The encoding of the header follows the ABNF as defined in IETF RFC 7230 [12].

3gpp-Sbi-Binding ="3gpp-Sbi-Binding" ":" 1#(OWS "bl=" blvalue 1*(";" OWS parameter) ";" OWS recoverytime)

blvalue="nf-instance"/"nf-set"/"nfservice-instance"/"nfservice-set"

parameter=parametername "=" token parametername="nfinst"/"nfset"/"nfservinst"/"nfserviceset"/"servname"/"scope"/"backupnfinst"

recoverytime="recoverytime=" OWS date-time

The following parameters are defined:

scope: indicates the applicability of a Binding Indication in a service request. This may take one of the following values:

"other-service": the binding information applies to other service(s) that the NF Service Consumer may later on provide as an NF Service Producer (see clause 6.12.3);

"subscription-events": the binding information applies to subscription change event notifications (see clause 6.12.4);

"callback": the binding information applies to notification or callback requests (see clauses 6.12.4 and 6.12.5).

The absence of this parameter in a Binding Indication in a service request shall be interpreted as "callback".

Two scope parameters may be present in a Binding Indication if the binding information applies to notification/callback requests and to other services.

servname (service name): indicates the name of a service, as defined in 3GPP TS 29.510 [8], or a custom service, i.e.:

the name of the service that handles a notification or a callback request, when present in a Binding Indication for a subscription or a callback, i.e. with a scope parameter absent or set to "callback"; or the name of the other service(s) for which the binding applies, when present in a Binding Indication in a service request for the other services the NF Service Consumer can provide later on as an NF Service Producer, i.e. with the scope parameter set to "other-service". More than one servname parameter may be present to represent multiple such services. The absence of this parameter in a Binding Indication with the scope parameter set to "other-service" shall be interpreted as binding information that applies to all the services that the NF Service Consumer may provide later as an NF Service Producer.

recoverytime: indicates the recovery timestamp of the entity corresponding to the highest resiliency level supported for the resource, that is, the higher level binding entity indicated in the Binding Indication. See Table 6.3.1.0-1 of 3GPP TS 23.501 [3] and clause 6.1 of 3GPP TS 23.527 [38]. The date-time type is specified in IETF RFC 5322 and clause 7.1.1.1 of IETF RFC 7231 [11].

for the definition and encoding of the blvalue, nfinst, backupnfinst, nfset, nfservinst and nfserviceset see clause 5.2.3.2.5.

EXAMPLES 1 to 5

Same as EXAMPLES 1 to 5 defined in clause 5.2.3.2.5, with the header name "3gpp-Sbi-Binding" instead of "3gpp-Sbi-Routing-Binding".

EXAMPLE 6

Subscription request from one NF on behalf of another NF, with 2 binding indications:
3gpp-Sbi-Binding:                                        bl=nf-set;
    nfset=set1.udmset.5gc.mnc012.mcc345;
servname=nudm-ee;scope=subscription-events
3gpp-Sbi-Binding:                                        bl=nf-set;
    nfset=set1.nefset.5gc.mnc012.mcc345;
servname=nnef-event-exposure

EXAMPLE 7

Service request with 2 binding indications, for callback requests and for other services the NF Service Consumer may provide later as an NF Service Producer:
3gpp-Sbi-Binding: bl=nf-instance; nfinst=54804518-4191-46b3-955c-ac6311953ed8;
nfset=set1.smfset.5gc.mnc012.mcc345;     servname=nsmf-pdusession
3gpp-Sbi-Binding: bl=nf-instance; nfinst=54804518-4191-46b3-955c-ac6311953ed8;
nfset=set1.smfset.5gc.mnc012.mcc345;     scope=other-service;
servname=nsmf-event-exposure

EXAMPLE 8

Service request with one binding indication applying to notification/callback requests and to any other services the NF Service Consumer may provide later as an NF Service Producer:
3gpp-Sbi-Binding:                                        bl=nf-set;
    nfset=set1.region48.amfset.5gc.mnc012.mcc345;
scope=callback; scope=other-service

EXAMPLE 9

Service request with one binding indication applying to notification/callback requests together with a recovery time stamp associated with the NF Set indicated in the binding indication and with the binding level set to "nfset":

3gpp-Sbi-Binding:         bl=nfset;         nfset=setl.region48.amfset.5gc.mnc012.mcc345;
scope=callback; recoverytime=Tue, 04 Feb 2020 08:49:37 GMT

EXAMPLE 10

Service response with one binding indication applying to the session context with a recovery time stamp associated with the NF Set indicated in "nfset" in the binding indication and with the binding level set to "nfinstance":
3gpp-Sbi-Binding: bl=nfinstance; nfinst=54804518-4191-46b3-955c-ac6311953ed8;
nfset=set1.smfset.5gc.mnc012.mcc345; recoverytime=Tue, 4 Feb. 2020 08:49:37 GMT

EXAMPLE 11

Service response with one binding indication applying to the session context with a recovery time stamp associated with the NF Instance included the binding indication and with the binding level set to nfserviceinstance:
3gpp-Sbi-Binding: bl=nfserviceinstance; nfservinst=xyz;
nfinst=54804518-4191-46b3-955c-ac6311953ed8;
recoverytime=Tue, 4 Feb. 2020 08:49:37 GMT
NOTE: Examples 6 and 7 are formatted as two distinct headers (which improves the readability), but they can also be formatted as a single header with two Binding Indication values separated by a comma.

6.12 Binding between an NF Service Consumer and an NF Service Resource 6.12.1 General A Binding Indication for an NF Service Resource may be provided to an NF Service Consumer of the resource as part of the Direct or Indirect Communication procedures, to be used in subsequent related service requests. This allows the NF Service Resource owner to indicate that the NF Service Consumer, for a particular resource, should be bound to an NF service instance, NF instance, NF service set or NF set. See clause 6.3.1.0 of 3GPP TS 23.501 [3] and clause 4.17.12 of 3GPP TS 23.502 [4].

A binding may be established or updated as part of a:
1) service response creating or modifying a resource, to be used for subsequent requests targeting this resource (see clause 4.17.12.2 of 3GPP TS 23.502 [4]), for any API that defines resources;
2) service request, if the NF Service Consumer can also act as an NF Service Producer for later communication from the contacted NF Service Producer, to be used for subsequent service requests initiated by the contacted NF Service Producer (see clause 4.17.12.3 of 3GPP TS 23.502 [4]);
3) service request creating or modifying an explicit or an implicit subscription, or as part of a notification response, to be used for subsequent notification requests initiated by the NF Service Producer (see clause 4.17.12.3 of 3GPP TS 23.502 [4]);
4) service response creating an implicit or explicit subscription or updating a subscription, or as part of a notification request, to be used for subsequent operations on the subscription (see clause 4.17.12.4 of 3GPP TS 23.502 [4]);
5) service request creating a callback (other than notification) resource (e.g. V-SMF or I-SMF callback URI sent to the H-SMF or SMF), or as part of a callback response, to be used for subsequent callback requests initiated by the NF Service Producer (e.g. H-SMF or SMF initiated PDU session modification).

Two types of binding information are defined to manage the binding between an NF Service Consumer and an NF Service Resource:

1) A Binding Indication conveys binding information for a resource which must be stored by the consumer (client) of that resource and used by the client to direct future requests to the resource. When contained in a service request, the binding information is associated with a resource owned by the NF Service Consumer for the current transaction. When contained in a service response, the binding information is associated with a resource owned by the NF Service Producer for the current transaction.

2) A Routing Binding Indication conveys binding information to direct a request from a client to a server which has the context. A Routing Binding Indication shall only be contained in an HTTP request.

A same service request may convey more than one Binding Indication, e.g.:

to provide bindings for notification or callback (i.e. bullets 3 or 5) and for other services that the NF service consumer can provide later as a NF Service Producer (i.e. bullet 2); or to provide binding information for different event notifications, when creating a subscription on behalf of another NF (see clause 6.12.4).

The scope parameter in a Binding Indication in a service request identifies the applicability of (i.e. scenario associated with) the binding information.

A service request may convey one or more Binding Indications as described above using a 3gpp-Sbi-Binding header and/or include a Binding Routing Indication to influence routing of the request e.g. to an appropriate set of NF Service Producers or to an appropriate service set of the NF Service Producer using a 3gpp-Sbi-Routing-Binding header. A service response may convey a Binding Indication for a resource using a 3gpp-Sbi-Binding header.

NOTE 1: An HTTP request can contain for instance one 3gpp-Sbi-Binding header containing two Binding Indications for other services and for callbacks, and one 3gpp-Sbi-Routing-Binding header conveying a Routing Binding Indication.

If an SCP receives a Routing Binding Indication within a service or notification request and decides to forward that request to a next-hop SCP, it shall include the Routing Binding Indication in the forwarded request. The SCP shall remove the Routing Binding Indication if it forwards the request to the target NF.

Binding Indications and Routing Binding Indications shall include the Binding level and one or more Binding entity IDs representing all NF service instances that are capable to serve service requests targeting the resource, i.e. that share the same resource contexts.

The Binding Level indicates a preferred binding to either a NF Instance, a NF set, a NF Service Instance or a NF Service Set. When sending a request targeting the resource, the binding entity corresponding to the binding level shall be selected whenever possible. If this is not possible, e.g. because the preferred binding entity is not reachable, the request should be sent to any other Binding entity signalled in the Binding Indication or Routing Binding Indication, in the following decreasing order of priority:

select an NF service instance in the same NF service set, if a NF service Set ID was signalled in the Binding Indication or Routing Binding Indication;

select an equivalent NF service instance in the same NF instance, if an NF instance ID was signalled in the Binding Indication or Routing Binding Indication;

select an NF service instance in an equivalent NF service set of the backup NF instance, if a NF service Set ID and backup NF Instance ID was signalled in the Binding Indication or Routing Binding Indication;

select an equivalent NF service instance in the backup NF instance, if backup NF Instance ID was signalled in the Binding Indication or Routing Binding Indication;

select an NF service instance in an equivalent NF service set of another NF instance of the NF set, if an NF Service Set ID and an NF Set ID were signalled in the Binding Indication or Routing Binding Indication;

select an equivalent NF service instance in another NF instance of the NF Set, if an NF Set ID was signalled in the Binding Indication or Routing Binding Indication.

NOTE 2: NF service instances from different NF instances are equivalent NF service instances if they share the same MCC, MNC, NID (for SNPN), ServiceName, API version, and, if applicable, NF Service Set ID (see clause 28.13 of 3GPP TS 23.003 [15]).

Binding Indications shall not be used if a particular resource can only be served by a specific NF service instance of an NF instance, i.e. if NF service instances of a same NF service are not capable to share resource inside the NF Instance. A resource for which no Binding Indication or Routing Binding Indication is signalled shall be considered to be bound exclusively to one NF service instance, unless the NF Service resource owner instance is part of an NF set (or AMF set) or an NF service set, or unless its NF profile in the NRF indicates that its supports NF service persistence within the NF instance (see clause 6.5 of 3GPP TS 23.527 [38]).

The invention claimed is:

1. A method in a network node implementing a Network Function, NF, comprising:

receiving, from another NF, information indicating an identifier, ID, of each of one or more backup entities for one or more contexts in the other NF, wherein the information is included in a binding indication or a separate indication from the binding indication, wherein the one or more backup entities are one or more backup NF instances or one or more backup NF service instances, wherein the binding indication contains a binding level set to NF service instance, NF service set, NF instance, or NF set, and one or more of an NF service instance ID, an NF service set ID, an NF instance ID, or an NF set ID, and the method further comprises, when the other NF is not available at a time subsequent to the receiving information indicating the ID of each of the one or more backup entities:

selecting an NF service instance in an equivalent NF service set of one of the one or more backup NF instances, when the NF service set ID is contained in the binding indication and the ID of each of the one or more backup NF instances is contained in the information, or selecting an equivalent NF service instance in one of the one or more backup NF instances, when the ID of each of the one or more backup NF instances is contained in the information, wherein the selecting the NF service instance in the equivalent NF service set of one of the one or more backup NF instances or the selecting an equivalent NF service instance in one of the one or more backup NF instances is performed with a lower priority than:

selecting an NF service instance in an NF service set indicated by the NF service set ID, when the NF service set ID is contained in the binding indication, and/or selecting an equivalent NF service instance in an NF instance indicated by the NF instance ID, when the NF instance ID is contained in the binding indication, and/or wherein the selecting the NF service instance in the equivalent NF service set of one of the one or more backup NF instances or the selecting an equivalent NF service instance in one of the one or more backup NF instances is performed with a higher priority than:

selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication; and/or selecting one of the one or more backup NF service instances when the ID of each of the one or more backup NF service instances is contained in the information, with a higher priority than:

selecting an NF service instance in an NF service set indicated by the NF service set ID, when the NF service set ID is contained in the binding indication, selecting an equivalent NF service instance in an NF instance indicated by the NF instance ID, when the NF instance ID is contained in the binding indication, selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication; or wherein the one or more backup entities correspond to a binding level indicated in the binding indication, and wherein the binding level is set to NF service instance and the one or more backup entities are one or more backup service instances, the binding level is set to NF service set and the one or more backup entities are one or more backup NF service sets, the binding level is set to NF instance and the one or more backup entities are one or more backup NF instances, or the binding level is set to NF set and the one or more backup entities are one or more backup NF sets, wherein the binding indication contains one or more of an NF service instance ID, an NF service set ID, an NF instance ID, or an NF set ID, and the method further comprises:

when the other NF is not available at a time subsequent to the receiving information indicating the ID of each of the one or more backup entities, selecting of one of the one or more backup service instances, the NF service instance in one of the one or more backup NF service sets, the equivalent NF service instance in one of the one or more backup NF instances, or the equivalent NF service instance in one of the one or more backup NF sets, wherein the selecting of one of the one or more backup service instances, the NF service instance in one of the one or more backup NF service sets, the equivalent NF service instance in one of the one or more backup NF instances, or the equivalent NF service instance in one of the one or more backup NF sets is performed with a lower priority than:

selecting an NF service instance in an NF service set indicated by the NF service set ID, when the NF service set ID is contained in the binding indication, and/or selecting an equivalent NF service instance in an NF instance indicated by the NF instance ID, when the NF instance ID is contained in the binding indication; and/or wherein the selecting of the one of the one or more backup service instances, the NF service instance in one of the one or more backup NF service sets, the equivalent NF service instance in one of the one or more backup NF instances, or the equivalent NF service instance in one of the one or more backup NF sets is performed with a higher priority than:

selecting an NF service instance in an equivalent NF service set of another NF instance of the NF set, when the NF service set ID and the NF set ID are contained in the binding indication, and/or selecting an equivalent NF service instance in another NF instance of the NF set, when the NF set ID is contained in the binding indication.

2. The method of claim 1, wherein the information is carried in a 3gpp-sbi-binding header in a service request, a service response, a subscription request, a subscription response, a notification request, or a notification response.

3. The method of claim 1, further comprising:

transmitting the information to a Service Communication Proxy, SCP, wherein the information is included in a routing binding indication or a separate indication from the routing binding indication, or wherein the information is carried in a 3gpp-sbi-routing-binding header in a service request, a service response, a subscription request, a subscription response, a notification request, or a notification response destined to the other NF.

4. A method in a network node implementing a Service Communication Proxy, SCP, comprising:

receiving, from a Network Function, NF, information indicating an identifier, ID, of each of one or more backup entities for one or more contexts in another NF, wherein the information is included in a routing binding indication or a separate indication from the routing binding indication, and wherein the one or more backup entities are one or more backup NF instances or one or more backup NF service instances;

wherein the routing binding indication contains a binding level set to NF service instance, NF service set, NF instance, or NF set, and one or more of an NF service instance ID, an NF service set ID, an NF instance ID, or an NF set ID, and the method further comprises, when the other NF is not available at a time subsequent to the receiving information indicating the ID of each of the one or more backup entities:

selecting an NF service instance in an equivalent NF service set of one of the one or more backup NF instances, when the NF service set ID is contained in the routing binding indication and the ID of each of the one or more backup NF instances is contained in the information, or selecting an equivalent NF service instance in one of the one or more backup NF instances, when the ID of each of the one or more backup NF instances is contained in the routing binding indication, wherein the selecting the NF service instance in the equivalent NF service set of one of the one or more backup NF instances or the selecting an equivalent NF service instance in one of the one or more backup NF instances is performed with a lower priority than:

selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication, and/or wherein the selecting the NF service instance in the equivalent NF service set of one of the one or more backup NF instances or the selecting an equivalent NF service instance in one of the one or more backup NF instances is performed with a higher priority than:

selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication; and/or selecting one of the one or more backup NF service instances when the ID of each of the one or more backup NF service instances is contained in the information, with a higher priority than:

selecting an NF service instance in an NF service set indicated by the NF service set ID, when the NF service set ID is contained in the routing binding indication, selecting an equivalent NF service instance in an NF instance indicated by the NF instance ID, when the NF instance ID is contained in the routing binding indication, selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication wherein the one or more backup entities correspond to a binding level indicated in the routing binding indication, and wherein the binding level is set to NF service instance and the one or more backup entities are one or more backup service instances, the binding level is set to NF service set and the one or more backup entities are one or more backup NF service sets, the binding level is set to NF instance and the one or more backup entities are one or more backup NF instances, or the binding level is set to NF set and the one or more backup entities are one or more backup NF sets, and wherein the routing binding indication contains one or more of an NF service instance ID, an NF service set ID, an NF instance ID, or an NF set ID, and the method further comprises: when the other NF is not available at a time subsequent to the receiving information indicating the ID of each of the one or more backup entities:

selecting of one of the one or more backup service instances, the NF service instance in one of the one or more backup NF service sets, the equivalent NF service instance in one of the one or more backup NF instances, or the equivalent NF service instance in one of the one or more backup NF sets, wherein the selecting of the one of the one or more backup service instances, the NF service instance in one of the one or more backup NF service sets, the equivalent NF service instance in one of the one or more backup NF instances, or the equivalent NF service instance in one of the one or more backup NF sets is performed with a lower priority than:

selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication; and/or wherein the selecting of the one of the one or more backup service instances, the NF service instance in one of the one or more backup NF service sets, the equivalent NF service instance in one of the one or more backup NF instances, or the equivalent NF service instance in one of the one or more backup NF sets is performed with a higher priority than:

selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

5. The method of claim 4, wherein the information is carried in a 3gpp-sbi-routing-binding header in a service request, a service response, a subscription request, a subscription response, a notification request, or a notification response destined to the other NF.

6. A network node, comprising a communication interface, a processor and a memory, the memory comprising instructions executable by the processor whereby the network node is operative to:

when implementing a Network Function, NF, perform following steps:

receiving, from another NF, information indicating an identifier, ID, of each of one or more backup entities for one or more contexts in the other NF, wherein the information is included in a binding indication or a separate indication from the binding indication, wherein the one or more backup entities are one or more backup NF instances or one or more backup NF service instances, wherein the routing binding indication contains a binding level set to NF service instance, NF service set, NF instance, or NF set, and one or more of an NF service instance ID, an NF service set ID, an NF instance ID, or an NF set ID, and the method further comprises, when the other NF is not available at a time subsequent to the receiving information indicating the ID of each of the one or more backup entities:

selecting an NF service instance in an equivalent NF service set of one of the one or more backup NF instances, when the NF service set ID is contained in the routing binding indication and the ID of each of the one or more backup NF instances is contained in the information, or selecting an equivalent NF service instance in one of the one or more backup NF instances, when the ID of each of the one or more backup NF instances is contained in the routing binding indication, wherein the selecting the NF service instance in the equivalent NF service set of one of the one or more backup NF instances or the selecting an equivalent NF service instance in one of the one or more backup NF instances is performed with a lower priority than:

selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication, and/or wherein the selecting the NF service instance in the equivalent NF service set of one of the one or more backup NF instances or the selecting an equivalent NF service instance in one of the one or more backup NF instances is performed with a higher priority than:

selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication; and/or selecting one of the one or more backup NF service instances when the ID of each of the one or more backup NF service instances is contained in the information, with a higher priority than:

selecting an NF service instance in an NF service set indicated by the NF service set ID, when the NF service set ID is contained in the routing binding indication, selecting an equivalent NF service instance in an NF instance indicated by the NF instance ID, when the NF instance ID is contained in the routing binding indication, selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication wherein the one or more backup entities correspond to a binding level indicated in the routing binding indication, and wherein the binding level is set to NF service instance and the one or more backup entities are one or more backup service instances, the binding level is set to NF service set and the one or more backup entities are one or more backup NF service sets, the binding level is set to NF instance and the one or more backup entities are one or more backup NF instances, or the binding level is set to NF set and the one or more backup entities are one or more backup NF sets, and wherein the routing binding indication contains one or more of an NF service instance ID, an NF service set ID, an NF instance ID, or an NF set ID, and the method further comprises: when the other NF is not available at a time subsequent to the receiving information indicating the ID of each of the one or more backup entities:

selecting of one of the one or more backup service instances, the NF service instance in one of the one or more backup NF service sets, the equivalent NF service instance in one of the one or more backup NF instances, or the equivalent NF service instance in one of the one or more backup NF sets, wherein the selecting of one of the one or more backup service instances, the NF service instance in one of the one or more backup NF service sets, the equivalent NF service instance in one of the one or more backup NF instances, or the equivalent NF service instance in one of the one or more backup NF sets is performed with a lower priority than:

selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication; and/or wherein the selecting of one of the one or more backup service instances, the NF service instance in one of the one or more backup NF service sets, the equivalent NF service instance in one of the one or more backup NF instances, or the equivalent NF service instance in one of the one or more backup NF sets is performed with a higher priority than:

selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication, or when implementing a Service Communication Proxy, SCP, function, perform following steps:

receiving, from a Network Function, NF, information indicating an identifier, ID, of each of one or more backup entities for one or more contexts in another NF, wherein the information is included in a routing binding indication or a separate indication from the routing binding indication, and wherein the one or more backup entities are one or more backup NF instances or one or more backup NF service instances;

wherein the routing binding indication contains a binding level set to NF service instance, NF service set, NF instance, or NF set, and one or more of an NF service instance ID, an NF service set ID, an NF instance ID, or an NF set ID, and the method further comprises, when the other NF is not available at a time subsequent to the receiving information indicating the ID of each of the one or more backup entities:

selecting an NF service instance in an equivalent NF service set of one of the one or more backup NF instances, when the NF service set ID is contained in the routing binding indication and the ID of each of the one or more backup NF instances is contained in the information, or selecting an equivalent NF service instance in one of the one or more backup NF instances, when the ID of each of the one or more backup NF instances is contained in the routing binding indication, wherein the selecting the NF service instance in the equivalent NF service set or the selecting an equivalent NF instance in one of the one or more backup NF instances is performed with a lower priority than:

selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication, and/or wherein the selecting the NF service instance in the equivalent NF service set or the selecting an equivalent NF instance in one of the one or more backup NF instances is performed with a higher priority than:

selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication; and/or selecting one of the one or more backup NF service instances when the ID of each of the one or more backup NF service instances is contained in the information, with a higher priority than:

selecting an NF service instance in an NF service set indicated by the NF service set ID, when the NF service set ID is contained in the routing binding indication, selecting an equivalent NF service instance in an NF instance indicated by the NF instance ID, when the NF instance ID is contained in the routing binding indication, selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication wherein the one or more backup entities correspond to a binding level indicated in the routing binding indication, and wherein the binding level is set to NF service instance and the one or more backup entities are one or more backup service instances, the binding level is set to NF service set and the one or more backup entities are one or more backup NF service sets, the binding level is set to NF instance and the one or more backup entities are one or more backup NF instances, or the binding level is set to NF set and the one or more backup entities are one or more backup NF sets, and wherein the routing binding indication contains one or more of an NF service instance ID, an NF service set ID, an NF instance ID, or an NF set ID, and the method further comprises: when the other NF is not available at a time subsequent to the receiving information indicating the ID of each of the one or more backup entities:

selecting of one of the one or more backup service instances, the NF service instance in one of the one or more backup NF service sets, the equivalent NF service instance in one of the one or more backup NF instances, or the equivalent NF service instance in one of the one or more backup NF sets, wherein the selecting the one of the one or more backup service instances, the NF service instance in one of the one or more backup NF service sets, the equivalent NF service instance in one of the one or more backup NF instances, or the equivalent NF service instance in one of the one or more backup NF sets is performed with a lower priority than:

selecting an NF service instance in an NF service set indicated by the NF service set ID, when the NF service set ID is contained in the routing binding indication, and/or selecting an equivalent NF service instance in an NF instance indicated by the NF instance ID, when the NF instance ID is contained in the routing binding indication; and/or wherein the selecting the one of the one or more backup service instances, the NF service instance in one of the one or more backup NF service sets, the equivalent NF service instance in one of the one or more backup NF instances, or the equivalent NF service instance in one of the one or more backup NF sets is performed with a higher priority than:

selecting an NF service instance in an equivalent NF service set of another NF instance of the NF set, when the NF service set ID and the NF set ID are contained in the routing binding indication, and/or selecting an equivalent NF service instance in another NF instance of the NF set, when the NF set ID is contained in the routing binding indication.

* * * * *